(12) United States Patent  (10) Patent No.: US 9,261,216 B2
Stalcup, II et al.  (45) Date of Patent: Feb. 16, 2016

(54) EXHAUST SYSTEM CONDUIT WITH THERMAL/NOISE INSULATION

(75) Inventors: Robert F. Stalcup, II, Covington, IN (US); Scott R. Swank, Williamsport, IN (US); R. Winfield Thomas, West Lebanon, IN (US)

(73) Assignee: TRU-FLEX, LLC, West Lebanon, IN (US)

(*) Notice: Subject to any disclaimer, the term of this patent is extended or adjusted under 35 U.S.C. 154(b) by 895 days.

(21) Appl. No.: 12/569,630

(22) Filed: Sep. 29, 2009

(65) Prior Publication Data

US 2011/0074147 A1  Mar. 31, 2011

(51) Int. Cl.
*F16L 11/15* (2006.01)
*F16L 51/02* (2006.01)
*F01N 13/14* (2010.01)
*F16L 11/26* (2006.01)
*F16L 55/033* (2006.01)

(52) U.S. Cl.
CPC ............. *F16L 51/026* (2013.01); *F01N 13/143* (2013.01); *F01N 13/148* (2013.01); *F16L 11/26* (2013.01); *F16L 55/0336* (2013.01); *F01N 2470/12* (2013.01)

(58) Field of Classification Search
USPC ............. 285/48–50, 123.17, 144.1, 223, 226, 285/229, 903
See application file for complete search history.

(56) References Cited

U.S. PATENT DOCUMENTS

| 4,047,740 | A | | 9/1977 | Young et al. |
| 4,278,277 | A | * | 7/1981 | Krijgsman ................... 285/93 |
| 5,222,288 | A | | 6/1993 | Thomas |
| 5,346,263 | A | | 9/1994 | Huzenlaub et al. |
| 5,957,504 | A | * | 9/1999 | Cwik ................... 285/49 |
| 6,427,727 | B1 | * | 8/2002 | Thomas ................... 138/106 |
| 6,497,254 | B2 | | 12/2002 | Thomas et al. |
| 6,893,053 | B2 | * | 5/2005 | Thomas et al. ............... 285/226 |
| 7,066,495 | B2 | | 6/2006 | Thomas et al. |
| 2003/0047941 | A1 | * | 3/2003 | Thomas et al. ............... 285/226 |
| 2004/0100094 | A1 | * | 5/2004 | Thomas et al. ............... 285/226 |

FOREIGN PATENT DOCUMENTS

| DE | 3708415 | A1 | 9/1988 |
| DE | 4042291 | A1 | 7/1992 |
| DE | 202006011404 | U1 | 11/2006 |
| DE | 102005052204 | A1 | 6/2007 |
| DE | 102007043944 | A1 | 3/2009 |
| EP | 0974741 | A1 | 1/2000 |
| EP | 1467072 | A1 | 10/2004 |
| EP | 1908936 | A1 | 4/2008 |
| FR | 2568309 | A1 | 1/1986 |

* cited by examiner

*Primary Examiner* — Aaron Dunwoody
*Assistant Examiner* — Fannie Kee
(74) *Attorney, Agent, or Firm* — Barnes & Thornburg, LLP

(57) ABSTRACT

A flexible conduit for use in a pipe system such as a vehicular exhaust system to provide a torsional or non-torsional joint between two pipes. The conduit has an outer bellows and an inner liner between which a layer of noise/thermal insulation is sandwiched.

6 Claims, 2 Drawing Sheets

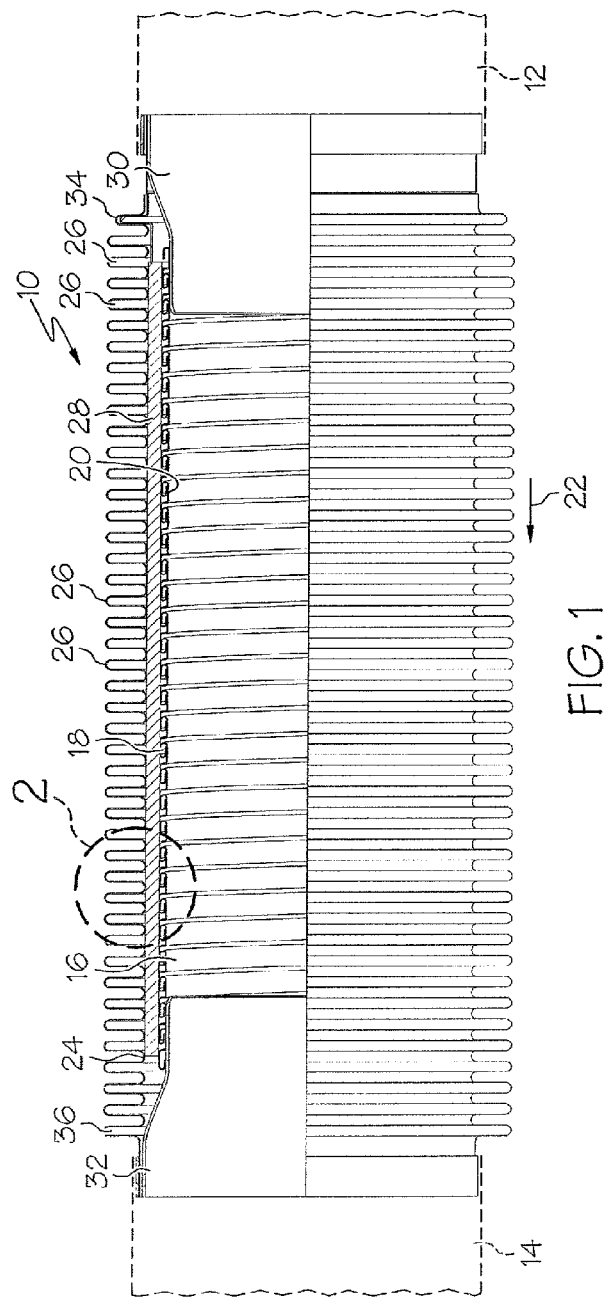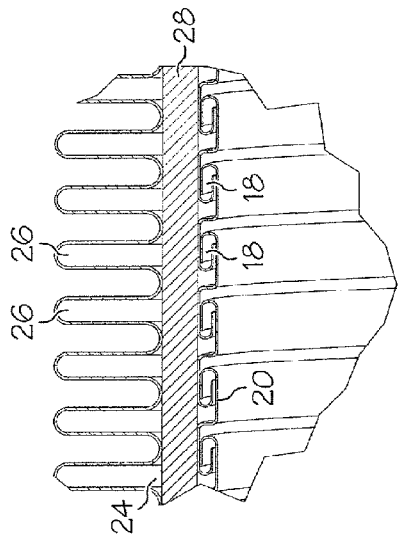

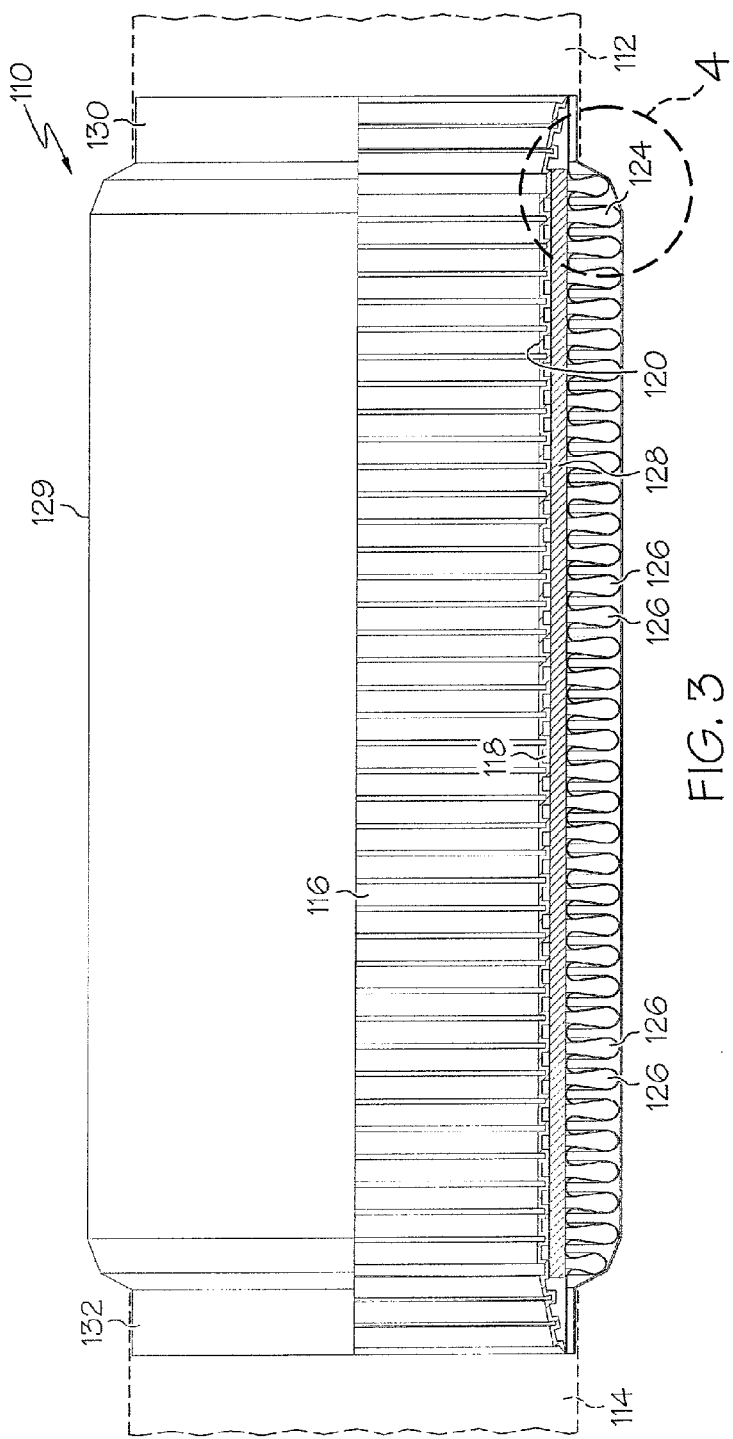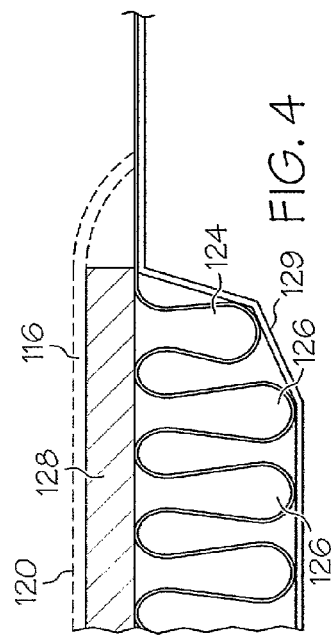

EXHAUST SYSTEM CONDUIT WITH THERMAL/NOISE INSULATION

CROSS-REFERENCE TO RELATED APPLICATIONS

None.

FIELD OF THE INVENTION

This invention relates generally to the field of pipe systems and more particularly to a flexible pipe system such as the type commonly used in vehicular exhaust systems or farm equipment, construction equipment, or other equipment.

BACKGROUND OF THE INVENTION

Flexible pipe and conduit structures are used in a variety of applications. For example, vehicular exhaust systems make use of flexible conduits in order to accommodate the jarring, vibration and thermal stresses to which the exhaust system is subjected when the vehicle is in use. Examples of spiral wound flexible pipes suitable for use in vehicular exhaust systems are disclosed in U.S. Pat. No. 6,497,254 to Thomas et al. Bellows type systems which provide flexibility by using corrugated conduits are exemplified by U.S. Pat. No. 7,066,495 to Thomas et al. The latter patent also discloses an arrangement for interfitting the corrugations on the pipes in a manner to allow relative rotation at the pipe joints.

These prior art exhaust systems function in a generally satisfactory manner for the most part. The flexibility of the pipes allows them to withstand the forces that are applied due to jolts, vibrations and thermal stresses. The rotary or torsional joint is especially beneficial in many applications because it is able to accommodate torsional loading without unduly stressing the pipes. Even so, the prior art exhaust systems of this type have not been completely free of problems.

In particular, the vibration and other movement creates substantial noise which can be aggravated by the hot exhaust gases going through the pipes. Additionally, the heat from the exhaust gases causes the outside surfaces of the pipes to reach temperatures that can be high enough to create undue heat stress on the piping and safety hazards if contacted by persons. These noise and heat problems have not been successfully addressed and have been increasing causes for concern due to the increasing emphasis that has been placed on controlling noise pollution and increasing concern with safety considerations.

SUMMARY OF THE INVENTION

The present invention is directed to a flexible conduit system which may be used in a variety of applications, including in an exhaust system for an engine used on vehicles, farm equipment, construction equipment or other equipment. In accordance with the invention, a conduit which is used to couple together a pair of pipes is constructed with a corrugated outer portion, an inside portion which may be a spirally wound strip with interlocked edges, and a layer of insulation sandwiched between the inside and outside portions.

The insulation layer may be constructed of any suitable material that is effective to suppress noise transmission within the conduit and to resist heat transmission. Additionally, the insulation provides a barrier that dampens vibration and prevents the inside and outside layers of the pipe from physically contacting each other. As a consequence, the conduit and the joints it makes with other pipe exhibit improved noise control, reduced heat transmission, diminished vibration, and enhanced structural capabilities. The conduit provides particular utility as a joint between two other pipes, and the joint may be constructed as either a torsional joint or a non-torsional joint depending upon the application.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views:

FIG. 1 is a sectional view showing a conduit constructed according to one preferred embodiment of the present invention, with the conduit having a configuration to provide a torsional joint between a pair of pipes;

FIG. 2 is a fragmentary sectional view on an enlarged scale of the detail identified at 2 in FIG. 1;

FIG. 3 is a sectional view of a conduit constructed according to another embodiment of The present invention, with the conduit arranged to provide a non-torsional joint; and FIG. 4 is a fragmentary sectional view on an enlarged scale of the detail identified at 4 in FIG. 3.

DETAILED DESCRIPTION OF THE PREFERRED EMBODIMENTS

Referring now to the drawings in more detail and initially to FIG. 1, numeral 10 generally designates a conduit which is constructed according to one embodiment of the present invention. The conduit 10 may couple together a pair of pipes 12 and 14. By way of example, the conduit 10 and the pipes 12 and 14 may be parts of a vehicular exhaust system through which exhaust gases flow.

The conduit 10 has an inner cylindrical liner portion 16 which may be constructed as a flexible conduit formed by a spirally wound strip 18 having edges of adjacent windings interlocked in the manner described in U.S. Pat. No. 6,427,727 to Thomas which is incorporated by reference. The liner portion 16 has a flexible construction which allows it to flex in a manner to withstand the forces that are applied to it in service. The liner portion 16 provides a cylindrical bore 20 through which the hot vehicular exhaust gases pass from pipe 12 to pipe 14, as shown by the directional arrow 22 in FIG. 1.

An outer portion of the conduit 10 is formed by a bellows 24 which extends around the liner 16 and has a plurality of corrugations 26 on its outer surface. The bellows 24 may be constructed in the manner disclosed in U.S. Pat. No. 7,066,495 to Thomas et al. which is incorporated by reference. Alternatively, the outer portion of conduit 10 may be constructed as a braided structure, an interlock flexible hose or in another manner providing flexibility to the conduit (not shown).

A cylindrical insulation blanket 28 is sandwiched between the inside liner 16 and the bellows 24. The layer or blanket 28 may be constructed of any material that is effective to attenuate noise, resist heat transmission, and/or dampen vibration. One material that is satisfactory for the blanket 28 is commercially available silica fiber insulation. However, additional materials having the necessary characteristics can also be used. The blanket 28 is enclosed within the conduit structure provided by the bellows 24 on the outside and the inside liner 16 on the inside.

The conduit 10 may be equipped with a pair of end fittings 30 and 32 which are located on opposite ends of the conduit 10. Fitting 30 has at least one exterior corrugation 34 that interfits with a mating corrugation 26 on or near the end of the bellows 24. The fit between these corrugations allow the fitting 30 to rotate relative to the bellows 24 with the corrugations continuing to mate during such rotation in order to maintain the integrity of the rotary or torsional joint. Similarly, fitting 32 has at least one corrugation 36 that interfits with a mating corrugation 26 on or near the opposite end of the bellows 24. This allows fitting 32 to rotate relative to bellows 24 similarly to fitting 30. Pipes 12 and 14 may be connected to the respective fittings 30 and 32 by welding or in any other suitable matter. In this way, the pipes 12 and 14 are allowed to rotate relative to the conduit 10 to relieve torsional stresses that may be applied to the pipe structure during use.

When the conduit 10 is used in a vehicular exhaust system, the flexibility provided by the strip wound inside liner portion 16 and the outer bellows 24 accommodates jolting, vibration and thermal stresses to which the exhaust system is subjected. The torsional joint provided by the rotary connections of the fittings 30 and 32 enables the pipe system to withstand rotary or torsional loads without undue stress.

The insulation blanket 28 is of particular importance because it reduces the noise that is generated within the piping system as the vehicle operates and hot exhaust gases flow through the pipes 12 and 14 and the conduit 10. At the same time, the thermal insulation provided by the blanket 28 reduces the heat transmission from the inside to the outside of the conduit 10, and the corrugations 26 act as cooling fins to dissipate the heat from the bellows 24. The insulation 28 also serves to dampen vibration of the pipe system and thus reduces the fatigue forces that can weaken pipe systems of this type over prolonged periods of operation.

Referring now to FIG. 3, numeral 110 generally identifies a conduit constructed according to a second embodiment of the invention. The conduit 110 is used to connect a pair of pipes 112 and 114 which may be part of a vehicular exhaust system or another type of pipe system.

The conduit 110 has an inside liner 116 which may be a spirally wound strip 118 interconnected at its edges in the manner described previously for conduit 16. The liner 116 provides a cylindrical bore 120 aligned with the bores of pipes 112 and 114 to accommodate the flow of materials such as hot exhaust gases from pipe 112 to pipe 114.

An outer portion of the conduit 110 is provided by a bellows 124 having a plurality of corrugations 126 on its outside surface. The bellows 124 may be constructed generally in the same manner as bellows 24.

An insulation blanket 128 is enclosed within conduit 110 between the inside liner 116 and bellows 124. The blanket 128 serves the same function as blanket 28 and may be constructed of the same materials and in a similar cylindrical configuration.

As best shown in FIG. 4, a flexible cover 129 may be used to closely cover the entirety of the conduit 110. The cover 129 may be secured in place by any suitable means and may be constructed of any suitable material, preferably wire braid.

The conduit 110 is provided with end flanges 130 and 132 which may be integral with the inside tube 116 and/or the bellows 124. The end fittings 130 and 132 are cylindrical and provide a convenient means for attaching conduit 110 to the pipes 112 and 114, as by welding the pipes to the end fittings.

In the embodiment of FIGS. 3 and 4, the conduit 110 provides a non-torsional joint between the pipes 112 and 114. The insulation blanket 128 provides the same noise attenuation, heat resistance and vibration dampening as blanket 28 when the pipe system is in service as a vehicular exhaust system or otherwise.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A flexible conduit structure for coupling first and second pipes, comprising:
   a conduit having first and second ends for connection with said first and second pipes, respectively;
   an outer portion of said conduit being constructed in a manner to provide flexibility to said conduit;
   an inner portion of said conduit being connected to said outer portion and arranged to provide a bore through said conduit for the passage of fluid therethrough; and
   an insulation blanket sandwiched between said outer and inner portions, said blanket being constructed to suppress noise and heat transmission from within said conduit;
   wherein said first and second ends each comprise an end fitting that includes an outer section having a diameter and an interior section having a reduced diameter sized for connection with said inner portion such that a space is defined between said inner portion and said outer portion, said insulation blanket being located within said space; and
   wherein said outer portion is connected with at least one of said first and second ends in a manner to allow the rotation of at least one of said first and second ends relative to said outer portion; and
   wherein corrugations are formed on said outer portion of said conduit; and each of said first and second ends of said conduit has a corrugation positioned axially between an end of the interior section and an end of the outer section, wherein the corrugation of said conduit fits in a corrugation on said outer portion in a manner to accommodate the rotation of said first and second ends relative to said outer portion.

2. A conduit structure as set forth in claim 1, wherein said inner portion of said conduit comprises a helically wound metal strip.

3. In a vehicle exhaust system, the combination of:
   first and second pipes and a conduit extending between and coupled with said first and second pipes, said conduit having first and second ends for connection with said first and second pipes;
   an outer portion of said conduit having a plurality of corrugations to accommodate flexing of said conduit;
   a liner on said conduit providing a flow channel through which vehicle exhaust gases can flow, said liner being connected with said outer portion of said conduit;
   an insulation blanket sandwiched between said liner and said outer portion of said conduit, said blanket being constructed of a material effective to suppress noise and heat transmission from within said conduit;

wherein said first and second ends each comprise an end fitting that includes an interior section, a transition, and an outer section having a diameter, the interior section having a reduced diameter sized for connection with said liner such that a space is defined between said liner and said outer portion, said insulation blanket being located within said space; and a corrugation positioned on the transition of each of said end fittings between the interior section and the outer section, the corrugation being arranged to interfit with a selected corrugation on said outer portion of said conduit in a manner to accommodate rotation of said conduit relative to said end fittings.

4. The combination of claim 3, wherein said liner comprises a metal strip arranged in a helical winding.

5. A flexible conduit structure for a vehicle exhaust system, comprising:

a conduit having a liner forming a flow passage for flow of vehicle exhaust gases therethrough and a corrugation body surrounding said liner, said corrugation body having a plurality of corrugations to provide flexibility of said conduit;

a pair of end fittings on opposite ends of said conduit for connection to respective pipes between which said flow passage directs vehicle exhaust gases;

a layer of insulation between said liner and said corrugation body constructed and arranged to suppress noise and heat transmission from within said conduit;

wherein each end fitting of said pair of end fittings includes an interior section having a reduced diameter sized for connection with said liner such that a space is defined between said liner and said corrugation body, said layer of insulation being located within said space; and wherein each end fitting of said pair of end fittings includes a corrugation positioned on a transition section extending between the interior section and a section of the end fitting that has a diameter larger than the interior section, the corrugation of each end fitting being arranged to interfit with a selected corrugation on said corrugation body in a manner to accommodate rotation of said conduit relative to said and fitting.

6. A conduit structure as set forth in claim 5, wherein said liner comprises a helically wound metal strip.

* * * * *